(12) United States Patent
Stark et al.

(10) Patent No.: US 9,640,015 B2
(45) Date of Patent: *May 2, 2017

(54) SYSTEMS AND METHODS FOR MERCHANDISE DISPLAY, SALE AND INVENTORY CONTROL

(71) Applicant: Kiosk Information Systems, Inc., Louisville, CO (US)

(72) Inventors: Donald W. Stark, Arvada, CO (US); Richard L. Malone, Lafayette, CO (US); Jason Gary Weihe, Longmont, CO (US); Roger H. Grow, Lafayette, CO (US)

(73) Assignee: Kiosk Information Systems, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,094

(22) Filed: Aug. 24, 2015

(65) Prior Publication Data
US 2015/0363993 A1 Dec. 17, 2015

Related U.S. Application Data

(63) Continuation of application No. 13/463,616, filed on May 3, 2012, now Pat. No. 9,135,216.
(Continued)

(51) Int. Cl.
*G06F 17/00* (2006.01)
*G06F 11/00* (2006.01)
(Continued)

(52) U.S. Cl.
CPC ............ *G07F 11/165* (2013.01); *G01B 21/00* (2013.01); *G06F 17/00* (2013.01); *G06Q 10/087* (2013.01);
(Continued)

(58) Field of Classification Search
CPC ........ G07F 11/165; G07F 9/026; G07F 11/32; G07F 11/62; G01B 21/00
(Continued)

(56) References Cited

U.S. PATENT DOCUMENTS 4,636,634 A * 1/1987 Harper ................ B65G 1/1371
235/385
5,490,245 A 2/1996 Wugofski
(Continued)

FOREIGN PATENT DOCUMENTS

JP S61131190 A 6/1986
JP H10198852 A 7/1998
(Continued)

OTHER PUBLICATIONS

Office Action issued in EP Application No. 12779904.7, mailed Jan. 29, 2016, 7 pages.
(Continued)

*Primary Examiner* — Michael K Collins
(74) *Attorney, Agent, or Firm* — Faegre Baker Daniels LLP

(57) ABSTRACT

An automated retail system according to embodiments of the present invention includes a front and/or rear product rack, each rack having a plurality of bins, each of which has a product door, the system further including a basket moveable along an x-y plane on a rail system to selectively open a product door of a product bin to permit the product within the bin to fall into the basket, the basket movable to a product delivery position to release the product from the basket. Such a system may include sensors and/or scanners to determine contents of each bin, such that any product may be placed in any bin, and inventory of each bin or all bins may be determined at any time. The basket may be config-
(Continued)

ured to move in x and y but not z directions, and may also serve as the sole actuation mechanism for opening the doors.

5 Claims, 19 Drawing Sheets

Related U.S. Application Data

(60) Provisional application No. 61/482,555, filed on May 4, 2011, provisional application No. 61/586,628, filed on Jan. 13, 2012.

(51) Int. Cl.
*G07F 11/16* (2006.01)
*G07F 11/32* (2006.01)
*G07F 11/62* (2006.01)
*G07F 9/02* (2006.01)
*G06Q 10/08* (2012.01)
*G01B 21/00* (2006.01)

(52) U.S. Cl.
CPC .............. *G07F 9/026* (2013.01); *G07F 11/32* (2013.01); *G07F 11/62* (2013.01)

(58) Field of Classification Search
USPC ..... 221/6, 13, 127, 129–131, 133, 155, 263; 700/232, 236, 242, 243
See application file for complete search history.

(56) References Cited

U.S. PATENT DOCUMENTS

| | | | |
|---|---|---|---|
| 5,499,707 A * | 3/1996 | Steury | G07F 7/069 186/36 |
| 6,031,529 A | 2/2000 | Migos et al. | |
| 6,707,381 B1 * | 3/2004 | Maloney | G07C 9/00103 340/568.1 |
| 6,871,325 B1 | 3/2005 | McNally et al. | |
| 7,062,773 B1 | 6/2006 | Siksa et al. | |
| 7,076,332 B2 | 7/2006 | Cifra et al. | |
| 7,496,053 B1 | 2/2009 | Seabaugh et al. | |
| 7,571,113 B2 | 8/2009 | Fettig et al. | |
| 7,624,375 B2 | 11/2009 | Santori et al. | |
| 7,895,530 B2 | 2/2011 | Leavitt et al. | |
| 8,090,472 B2 * | 1/2012 | Schifman | G07F 11/44 700/231 |
| 8,230,662 B2 * | 7/2012 | Boutin | G07F 11/165 221/211 |
| 8,453,109 B2 | 5/2013 | Chupa et al. | |
| 8,677,272 B2 | 3/2014 | Lance | |
| 8,793,588 B2 | 7/2014 | DiPietro | |
| 8,856,667 B2 | 10/2014 | Gaudette | |
| 8,938,685 B2 | 1/2015 | Zavatone | |
| 9,098,294 B2 | 8/2015 | Zavatone et al. | |
| 9,135,216 B2 * | 9/2015 | Stark | G07F 11/165 |
| 2002/0149623 A1 | 10/2002 | West et al. | |
| 2008/0255901 A1 | 10/2008 | Carroll et al. | |
| 2008/0306886 A1 | 12/2008 | Otto et al. | |
| 2009/0228831 A1 | 9/2009 | Wendker et al. | |
| 2009/0313139 A1 | 12/2009 | Nam et al. | |
| 2010/0042506 A1 | 2/2010 | Ravenel et al. | |
| 2010/0306651 A1 | 12/2010 | Quennesson et al. | |
| 2012/0029687 A1 * | 2/2012 | Hagen | G07F 11/165 700/218 |

FOREIGN PATENT DOCUMENTS

| | | |
|---|---|---|
| JP | H10279025 A | 10/1998 |
| JP | 200377044 A | 3/2003 |
| JP | 2005284587 A | 10/2005 |

OTHER PUBLICATIONS

Office Action issued in Japanese Application No. 2014-509449 mailed Jun. 29, 2016, 8 pages (with English translation).

* cited by examiner

SYSTEMS AND METHODS FOR MERCHANDISE DISPLAY, SALE AND INVENTORY CONTROL

CROSS-REFERENCE TO RELATED APPLICATIONS

This application is a continuation of U.S. patent application Ser. No. 13/463,616, filed on May 3, 2012, which claims the benefit of U.S. Provisional Patent Application Ser. No. 61/482,555, filed on May 4, 2011, and of U.S. Provisional Patent Application Ser. No. 61/586,628, filed on Jan. 13, 2012. Each of the above applications are incorporated herein by reference for all purposes.

TECHNICAL FIELD

Embodiments of the present invention relate to automated vending.

BACKGROUND

Current automated vending systems often do not permit precise control of inventory and sale of particular products within the vending systems. For example, such automated vending systems often require that the vended products be manually placed into a particular arrangement, or that each product be placed into a particular receptacle, and/or that the vending system be programmed or notified, each time inventory is added or subtracted, of the particular receptacle locations corresponding to a particular item or type of item. In such arrangements, precise, automated inventory control is hindered, and risk of inventory anomalies (e.g. unaccounted theft or product damage) is increased. Such systems often operate according to an assumption that the physical presence of the vended items, and their location within the vending system, remains the same from the time the products are loaded into the vending system to the time the products are dispensed from the vending system. For various reasons, this assumption leads to inefficiencies and errors in inventory management, and can often be a hindrance to automated inventory management.

SUMMARY

An automated retail system according to embodiments of the present invention includes a front and/or rear product rack, each rack having a plurality of bins, each of which has a product door, the system further including a basket moveable along an x-y plane on a rail system to selectively open a product door of a product bin to permit the product within the bin to fall or be ejected into the basket, the basket movable to a product delivery position to release the product from the basket. Such a system may include sensors and/or scanners to determine contents of each bin, such that any product may be placed in any bin, and the inventory of each bin or all bins may be determined at any time. The basket may be configured to move in x and y but not z directions, and may also serve as the sole actuation mechanism for opening the doors.

A system for automated retail according to embodiments of the present invention includes a product rack, the product rack comprising a plurality of compartments arranged along one or both of a horizontal axis and a vertical axis; wherein at least one compartment of the plurality of compartments comprises a door configured to open and close the at least one compartment, wherein at least a portion of the door is substantially transparent; a basket; a gantry system, wherein the basket is movably coupled to the gantry system, wherein the gantry system is configured to position the basket adjacent to any of the plurality of compartments by moving the basket along one or both of the horizontal axis and the vertical axis; and a scanner that moves with the basket, wherein the scanner is configured to identify a product within the at least one compartment or to determine that the at least one compartment is empty, and wherein a scanner signal of the scanner is configured to pass through the at least a portion of the door.

The system of paragraph [0005], wherein the basket does not have any component of movement along a direction that is substantially orthogonal to both the horizontal axis and the vertical axis.

The system of any of paragraphs [0005] to [0006], wherein the product rack is a first product rack, the system further comprising a second product rack, wherein the gantry system and basket are situated between the first and second product racks.

The system of any of paragraphs [0005] to [0007], wherein the basket and gantry system are configured to retrieve products from one or more compartments in the first product rack and one or more compartments in the second product rack.

The system of any of paragraphs [0005] to [0008], further comprising a delivery chute.

The system of any of paragraphs [0005] to [0009], further comprising a discard bin.

The system of any of paragraphs [0005] to [0010], further comprising a sensor configured to determine when the product enters the basket.

The system of any of paragraphs [0005] to [0011], further comprising a sensor configured to determine when the product enters the delivery chute.

The system of any of paragraphs [0005] to [0012], further comprising a door actuator, wherein the door actuator is configured to open the door upon movement of the basket along one or both of the horizontal axis and the vertical axis.

The system of any of paragraphs [0005] to [0013], wherein the door comprises a contact element, and wherein the door actuator is configured to open the door when the door actuator is pushed against the door actuator.

The system of any of paragraphs [0005] to [0014], wherein the door actuator is extendable and retractable.

The system of any of paragraphs [0005] to [0015], wherein the door actuator is mounted to the basket.

The system of any of paragraphs [0005] to [0016], wherein the scanner is mounted adjacent to the basket.

The system of any of paragraphs [0005] to [0017], wherein the scanner is mounted on the basket.

The system of any of paragraphs [0005] to [0018], wherein the at least one compartment comprises a bottom that is at least partially sloped, wherein the bottom is configured to permit a product in the at least one compartment to slide out of the compartment when the door is opened.

The system of any of paragraphs [0005] to [0019], wherein a top of the basket is open to receive the product, and wherein a side wall of the basket closest to the product rack is at least partially sloped.

The system of any of paragraphs [0005] to [0020], further comprising a delivery chute, wherein the basket comprises a trap door configured to open when the basket is positioned above the delivery chute.

The system of any of paragraphs [0005] to [0021], wherein the delivery chute comprises a door actuator and the trap door comprises a contact element, and wherein the trap door is configured to open when the contact element is lowered onto the door actuator.

A method for determining size and position of compartments in automated retail according to embodiments of the present invention includes using a gantry system, moving a scanner along a product rack along a horizontal axis and a vertical axis; recording a horizontal position and a width of each compartment or column of compartments of the product rack along the horizontal axis; recording a vertical position and a height of each compartment or row of compartments of the product rack along the vertical axis; scanning contents of each compartment of the product rack through a door on each compartment that is at least partially transparent.

The method of paragraph [0023], wherein moving the scanner along the product rack along a horizontal axis and a vertical axis comprises moving the scanner along the product rack simultaneously along the horizontal axis and the vertical axis.

The method of any of paragraphs [0023] to [0024], wherein scanning contents of each compartment of the product rack through the door on each compartment comprises scanning the contents of each compartment without opening the door.

The method of any of paragraphs [0023] to [0025], further comprising:
assembling vertical panels and horizontal panels to form the product rack with compartments of desired size.

The method of any of paragraphs [0023] to [0027], wherein scanning contents of each compartment comprises scanning contents of each compartment a first time, the method further comprising scanning contents of each compartment a second time.

The method of any of paragraphs [0023] to [0028], wherein no longer than twenty-four hours passes between the first time and the second time.

The method of any of paragraphs [0023] to [0029], wherein no longer than eight hours passes between the first time and the second time.

The method of any of paragraphs [0023] to [0030] wherein no longer than one hour passes between the first time and the second time.

The method of any of paragraphs [0023] to [0031], wherein the scanning contents of each compartment the second time is performed based on an error message.

The method of any of paragraphs [0023] to [0032], wherein the compartments are restocked between the first time and the second time.

The method of any of paragraphs [0023] to [0033], wherein a bottom of each compartment is provided with a marking, and wherein scanning the marking indicates absence of a product in the compartment.

The method of any of paragraphs [0023] to [0034], further comprising: receiving a request for a particular product; identifying a particular compartment of the product rack in which the particular product resides; and using the gantry system to move a basket to the particular compartment.

The method of any of paragraphs [0023] to [0035], further comprising: opening a door to the particular compartment by moving the basket with the gantry system.

The method of any of paragraphs [0023] to [0036], further comprising: opening the door to the particular compartment by moving a door actuator of the basket onto a contact element of the door; and receiving the particular product within the basket.

The method of any of paragraphs [0023] to [0037], wherein opening the door further comprises: extending the door actuator in a direction that is at least partially perpendicular to the horizontal axis and the vertical axis.

The method of any of paragraphs [0023] to [0038], further comprising retracting the door actuator in the direction.

The method of any of paragraphs [0023] to [0039], further comprising: using the gantry to move the basket to a location over a delivery chute; and releasing the particular product from the basket into the delivery chute.

The method of any of paragraphs [0023] to [0040], wherein releasing the particular product from the basket into the delivery chute comprises: opening a trap door on a bottom of the basket.

The method of any of paragraphs [0023] to [0041], wherein opening the trap door comprises moving a contact element on the trap door onto a door actuator on the delivery chute, using the gantry system.

The method of any of paragraphs [0023] to [0042], further comprising: sensing entry of the particular product into the delivery chute.

The method of any of paragraphs [0023] to [0043], further comprising: sensing a position of the trap door.

The method of any of paragraphs [0023] to [0044], further comprising: sensing a position of the door.

The method of any of paragraphs [0023] to [0045], further comprising: determining that an unexpected number of products have entered the basket; based on the determination, using the gantry to move the basket to a location over an auxiliary bin; and releasing the unexpected number of products from the basket into the auxiliary bin.

The method of any of paragraphs [0023] to [0046], further comprising: receiving the particular product in the basket; and scanning the particular product while it is in the basket.

The method of any of paragraphs [0023] to [0047], further comprising: receiving the particular product in the basket.

The method of any of paragraphs [0023] to [0048], further comprising sensing entry of the particular product in the basket.

The method of any of paragraphs [0023] to [0049], further comprising sensing exit of the particular product from the basket.

The method of any of paragraphs [0023] to [0050], wherein the unexpected number of products is zero products or two products.

The method of any of paragraphs [0023] to [0051], wherein the gantry is capable of moving only along the vertical and horizontal axes.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
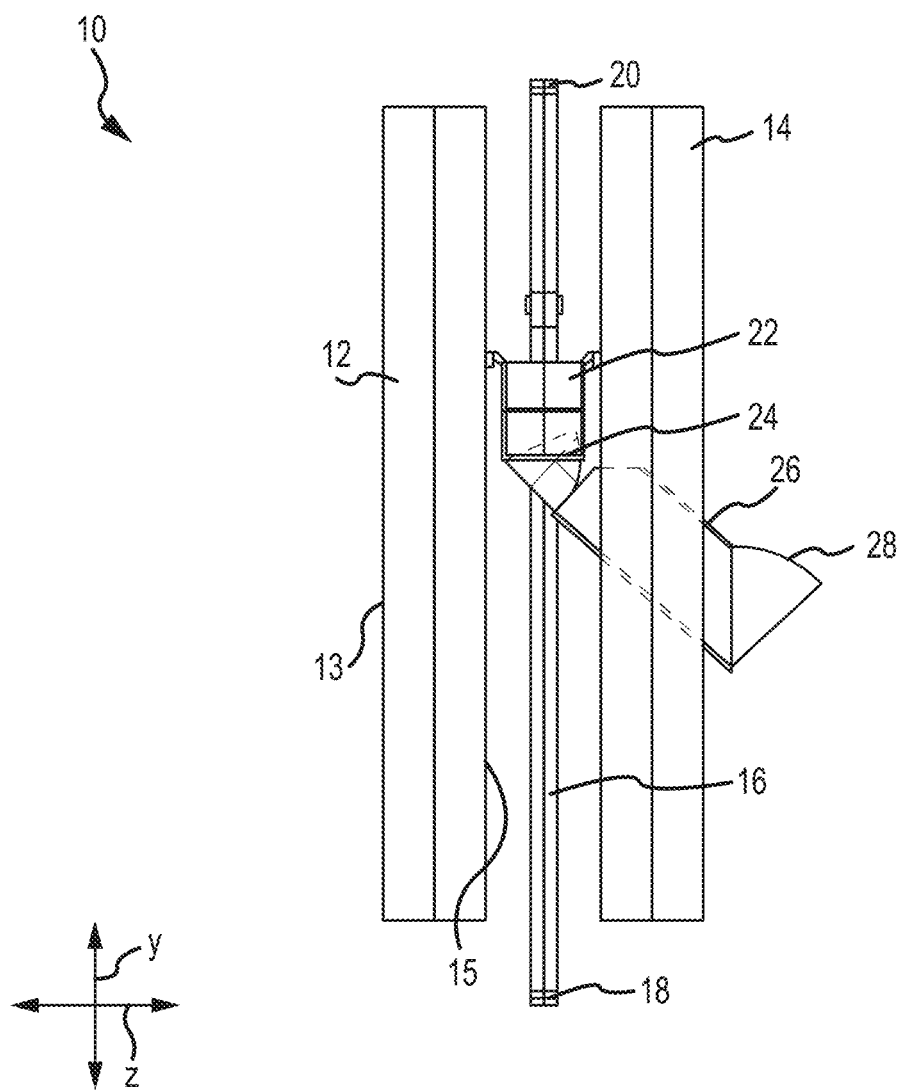
FIG. 1 illustrates a side elevation view of an automated retail system, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 2:
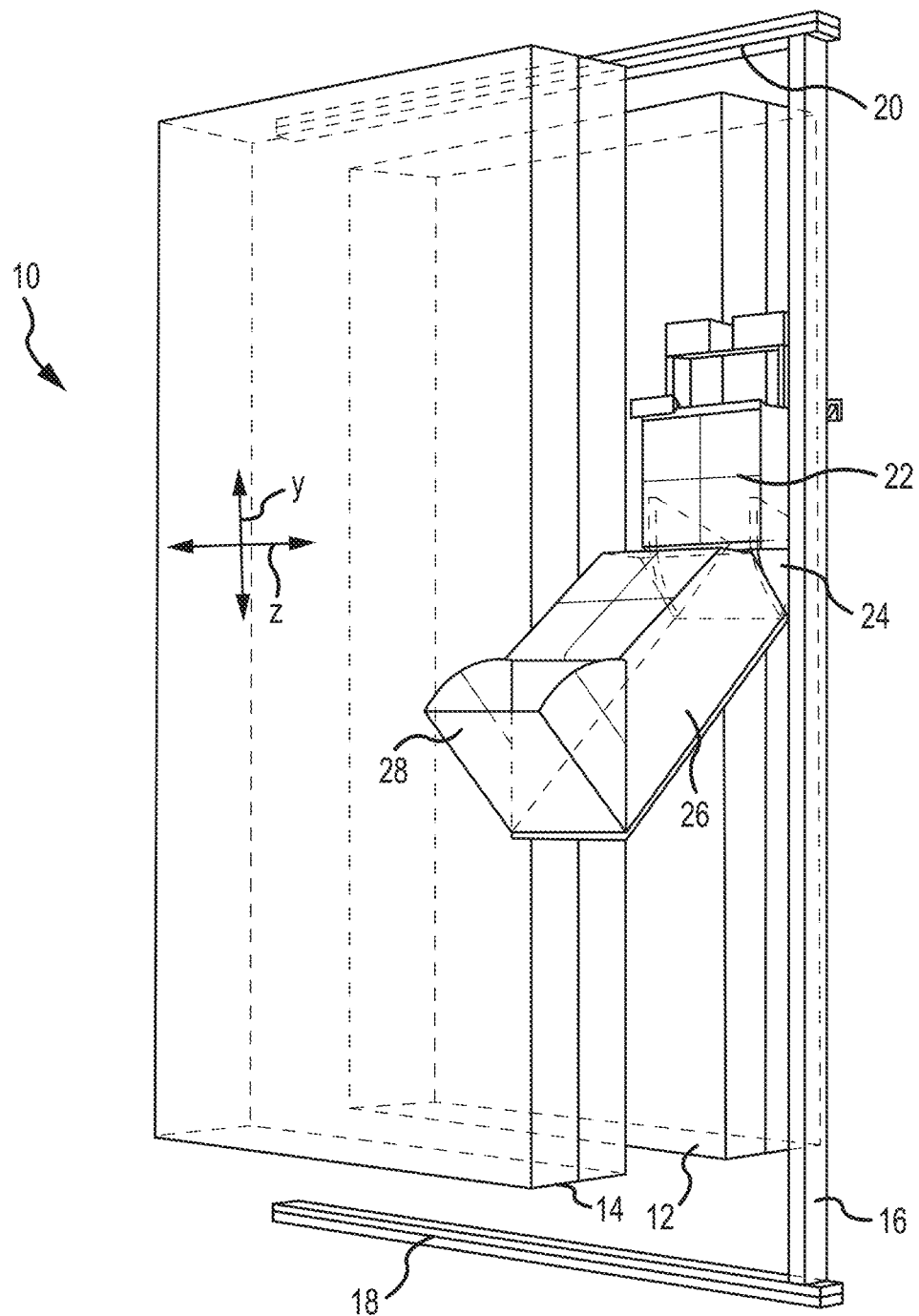
FIG. 2 illustrates a front perspective view of the automated retail system of FIG. 1, according to embodiments of the present invention.

FIGS. 1 and 2 illustrates an automated retail system 10, according to embodiments of the present invention. Automated retail system 10 includes a front product rack 14 and a rear product rack 12, as well as a rail system including a lower horizontal rail 18, an upper horizontal rail 20, and a vertical rail 16. As used herein, the term "vertical" is used to refer to a direction that is substantially parallel to a direction of a gravitational force, and the term "horizontal" is used to refer to a direction that is substantially perpendicular to the direction of the gravitational force. For example, a vertical direction would be a substantially parallel to the y direction indicated in FIG. 2, while a horizontal direction would be substantially parallel to the x direction indicated in FIG. 2.

The automated retail system 10 may further include a delivery basket 22 configured to be moved up and down along the vertical rail 16, with the vertical rail configured to move back-and-forth along the lower and upper horizontal rails 18, 20. This rail system, which may also be referred to as a gantry or gantry system, permits the product delivery basket 22 to be moved to any position along the front and/or rear product racks 12, 14 within the x-y range of motion. Once the delivery basket 22 is moved to the desired position and the product delivery door is opened, the product slides into the delivery basket 22. The delivery basket 22 is then moved to the x-y position corresponding to the delivery chute 26, where the basket trap door 24 is opened to permit the product to slide out of the basket 22, along the trap door 24, and into the delivery chute 26, where it may be retrieved through the delivery door 28, according to embodiments of the present invention.

Figure 3:
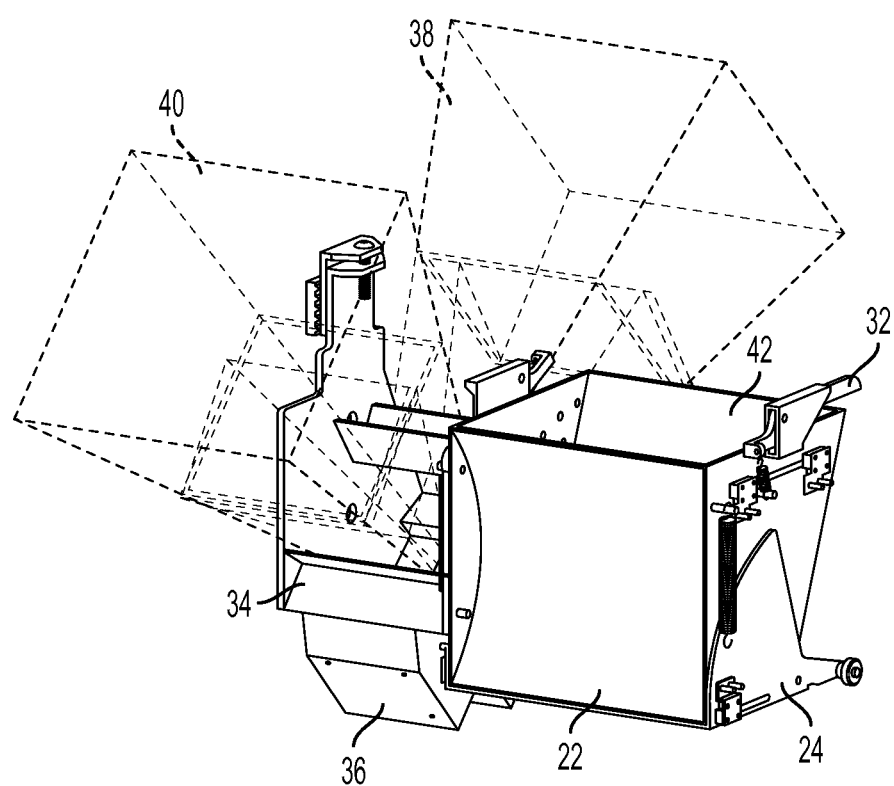
FIG. 3 illustrates a front perspective view of a product delivery basket, according to embodiments of the present invention.
Figure 4:
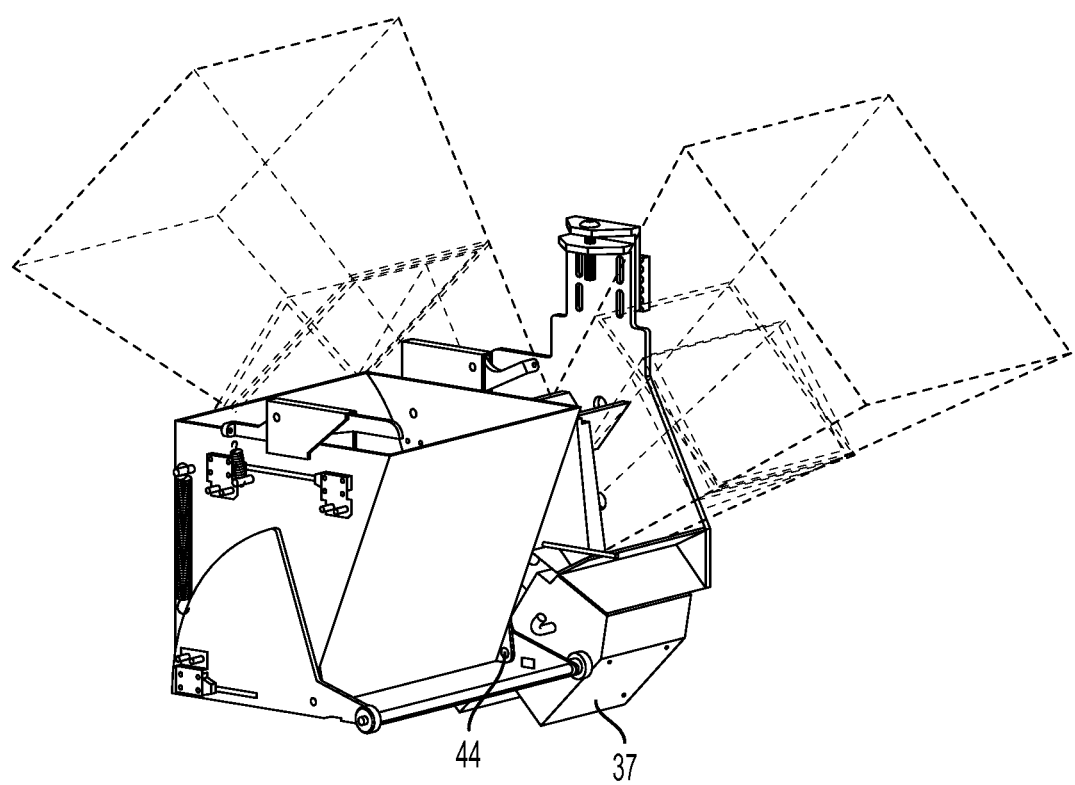
FIG. 4 illustrates a rear perspective view of the product delivery basket of FIG. 3, according to embodiments of the present invention.

FIGS. 3 and 4 illustrate front perspective views of a product delivery basket 22, according to embodiments of the present invention. Product delivery basket 22 includes a basket trap door 24, which extends under the bottom of the product delivery basket 22 in a closed configuration, and a door actuator 32, according to embodiments of the present invention. Product delivery basket 22 further includes a sensor mount 34, to which are mounted two product identification sensors 36, 37. Product identification sensors 36, 37 may be laser-based bar code scanners, camera or imaging sensors, and/or radio frequency identification (RFID) sensors, according to embodiments of the present invention. The superimposed projection cones 38, 40 are included to illustrate an exemplary three-dimensional range of the sensors 36, 37, according to embodiments of the present invention.

Figure 5:
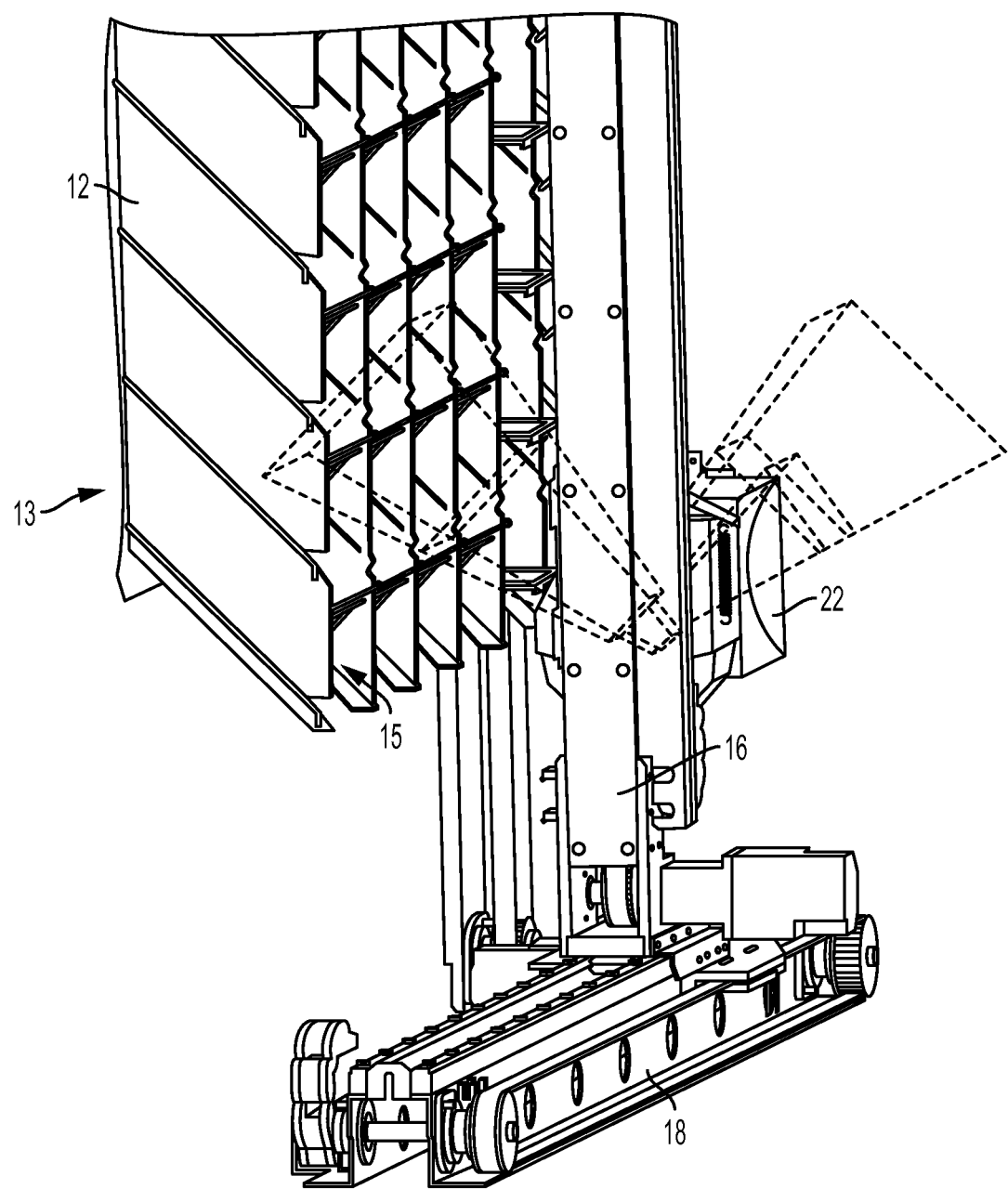
FIG. 5 illustrates a front perspective view of an automated retail system with a rear product rack, according to embodiments of the present invention.

FIG. 5 illustrates a front perspective view of an automated retail system with a rear product rack 12, according to embodiments of the present invention. The product rack 12 includes a number of product chambers or receptacles, which may be arranged into columns and rows, for example. Products may be initially loaded into the receptacles through the back side 13 of the product rack 12, and then retrieved by the basket 22 from the front side 15 of the product rack 12, according to embodiments of the present invention. Alternatively, products may be initially loaded into the receptacles from the front side 15. According to embodiments of the present invention, one product is loaded into each product receptacle. According to other embodiments, more than one product is loaded into each product receptacle.

Figure 6:
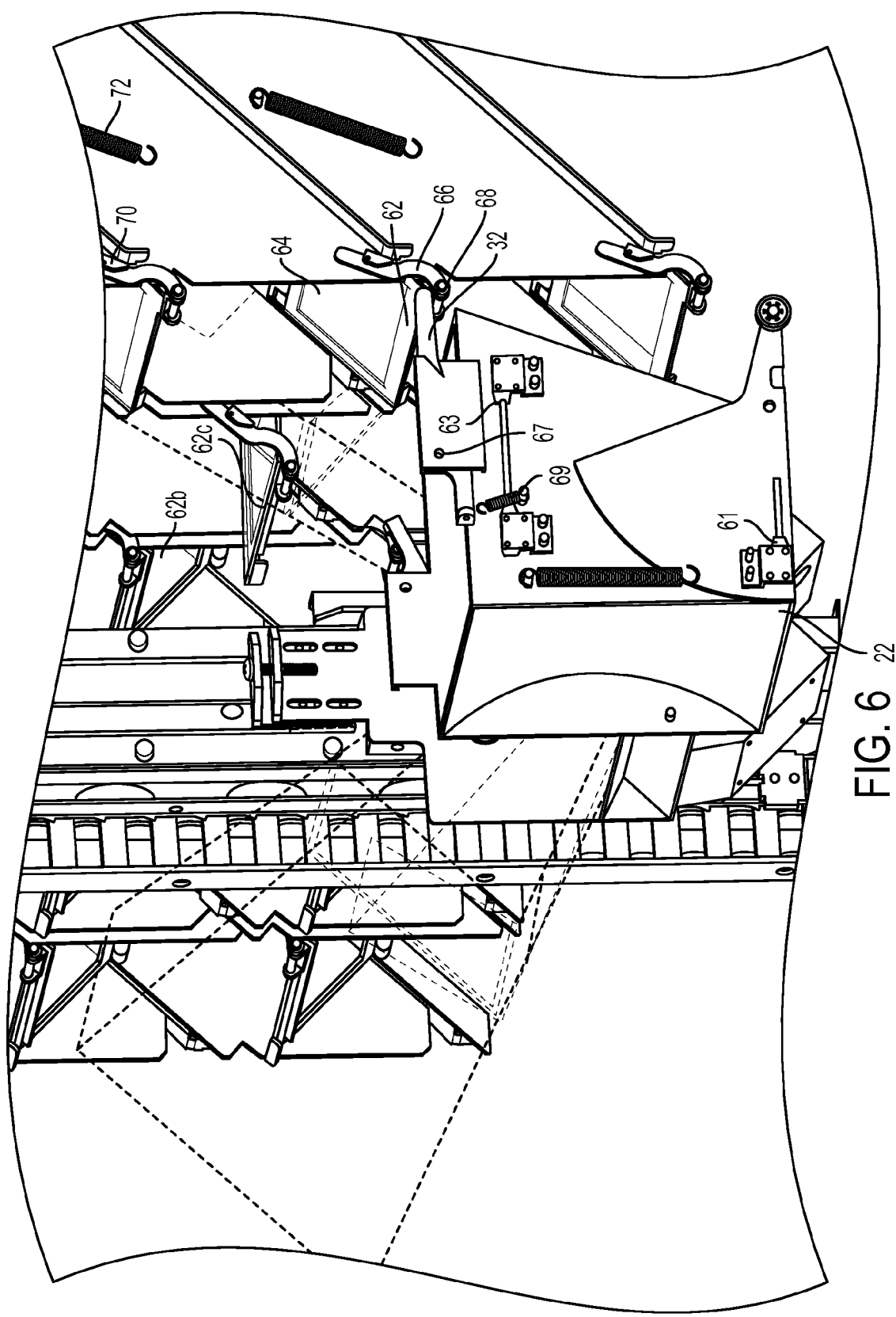
FIG. 6 illustrates an alternative front perspective view of the automated retail system of FIG. 5, showing the product delivery basket, according to embodiments of the present invention.
Figure 7:
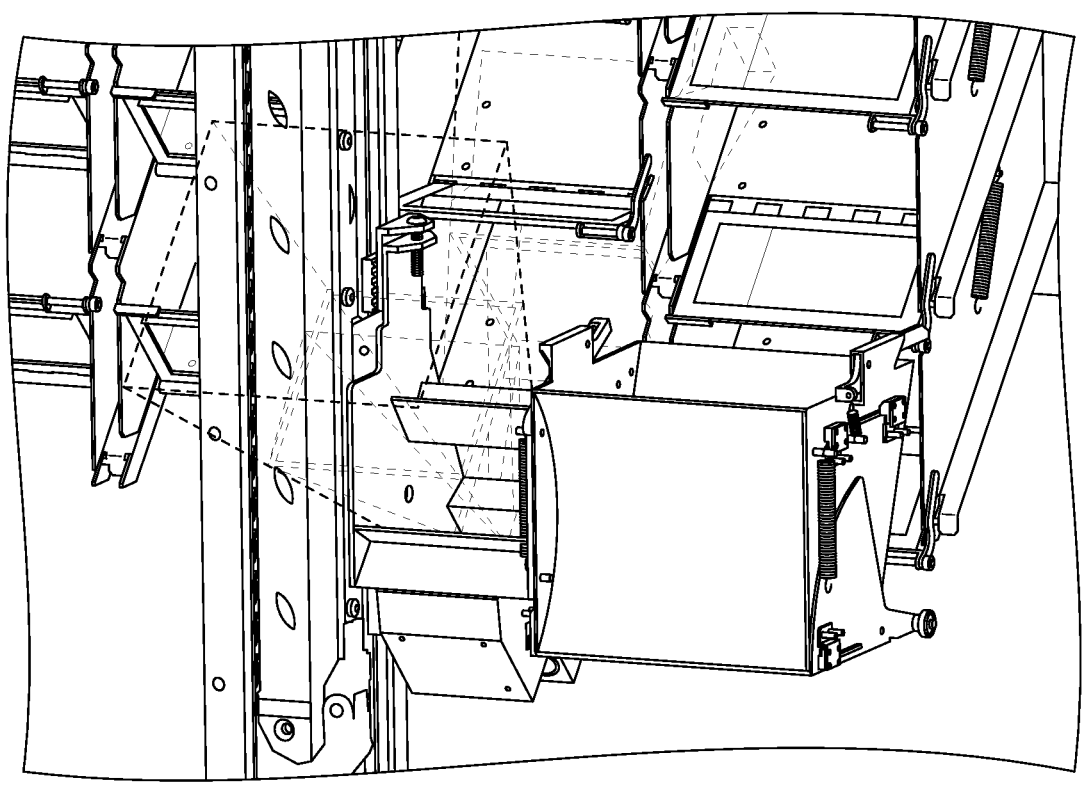
FIG. 7 illustrates an alternative front perspective view of the automated retail system of FIGS. 5 and 6, according to embodiments of the present invention.

As shown in FIG. 6, once the product is loaded into the receptacle, a door 62 prevents the product from falling out of the receptacle. The bottom surface of each receptacle may be sloped or ramped, downwardly from the back of the rack 13 toward the front of the rack 13, to facilitate product delivery. For example, this slope or ramp of each receptacle permits the product to slide easily into the delivery basket 22 once the product door 62 is opened.

FIG. 6 illustrates one way in which the delivery basket 22 may be used to open a product delivery door 62, according to embodiments of the present invention. According to embodiments of the present invention, the product delivery basket 22 moves only along the x-y plane, and does not move in the z direction (which is perpendicular to both the x and y directions). This saves cost and expense for building the system 10, and also simplifies and expedites product delivery. The product delivery basket 22 includes a door actuator 32. Door actuator 32 may be a rod that extends from the delivery basket 22 toward the product rack 12; door actuator 32 may be rigidly affixed, and/or pivotably coupled to the delivery basket 22 at pivot point 67 and biased in a downward position by one or more resilient members, for example spring 69, according to embodiments of the present invention. According to some embodiments of the present invention, door actuator 32 is not extendable or retractable in the z direction.

Each product door 62 includes a door front 64, as well as a side lever 66 pivotally coupled to the door 62. A spring 72 may be attached to the door 62 and/or side lever 66 in order to bias the product delivery door in a closed position (as demonstrated by door 62b), so that the product is retained within the receptacle by the door 62b until the door is opened by the door actuator 32. Each door 62 may also include a contact element 68, for example a freely rotating wheel 68, configured to be contacted by the door actuator 32. As seen in FIG. 6, the contact elements 68 extend into and/or beyond the same plane within which the door actuator 32 moves; therefore, the control system which controls the x-y position of the basket 22 is programmed so as not to inadvertently move the door actuator 32 into contact with the contact elements 68. When a particular item has been selected for delivery, the control system causes the delivery basket 22 to be moved to a position in which the door actuator 32 is directly above the contact element 68 corresponding to the door 62 to be opened, and then the basket 22 (and door actuator 32) are moved downwardly (in a negative y direction) such that the door actuator 32 pushes downwardly on the contact element 68 to lower the door 62. The contact element 68 may be a freely rotating wheel, and may include a rubber or other gripping surface to prevent slippage, while rotating to prevent binding as the door 62 is opened, according to embodiments of the present invention. Door 62b is depicted in a closed position, while door 62c is depicted in a partially opened position, and door 62 is depicted in a fully opened position. The doors directly above and below door 62 are also depicted in an open position, as well as door 62c in a partially open position, for illustrative purpose only; during use, normally only one door 62 is opened at any given time by the door actuator 32, according to embodiments of the present invention.

The delivery basket 22 and door actuator 32 are positioned with respect to each other such that, once the door 62 is opened, the product which was formerly held stationary behind the door 62 then slides over the door 62 (which has been opened to form a downward sloped ramp) and into the basket 22. As discussed above, the inside 42 of the basket 22 may also be sloped to as to accommodate the downward slide of the released product. After product release into the basket 22, the door actuator 32 and basket 22 may be raised to permit the door 62 to close (e.g. via spring action 72), or the door actuator 32 and basket 22 may be moved in a positive or negative x direction to slip the door actuator 32 off of the contact element 68, according to embodiments of the present invention.

Figure 8:
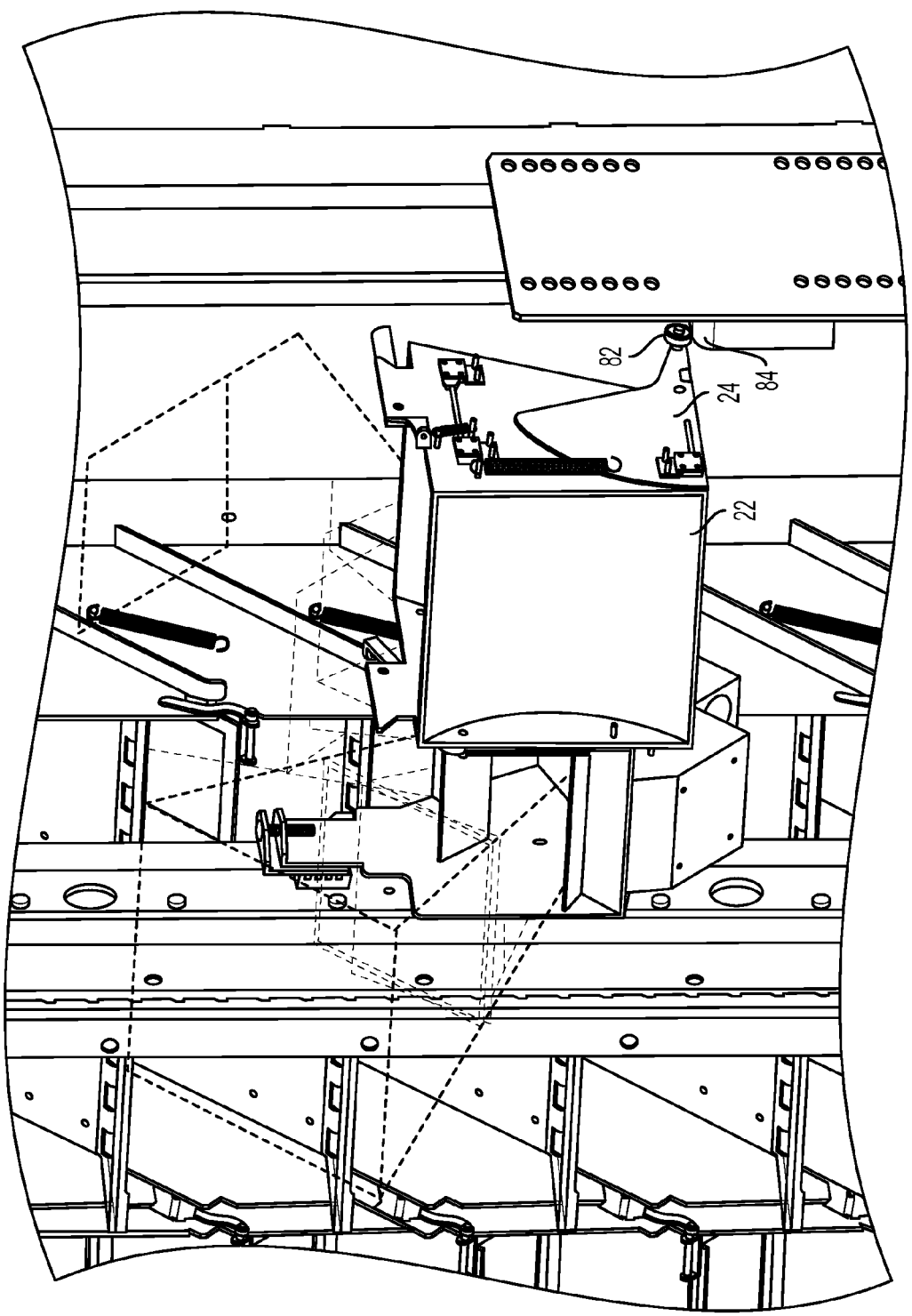
FIG. 8 illustrates a front perspective view of a product delivery basket and delivery door activation mechanism, according to embodiments of the present invention.
Figure 9:
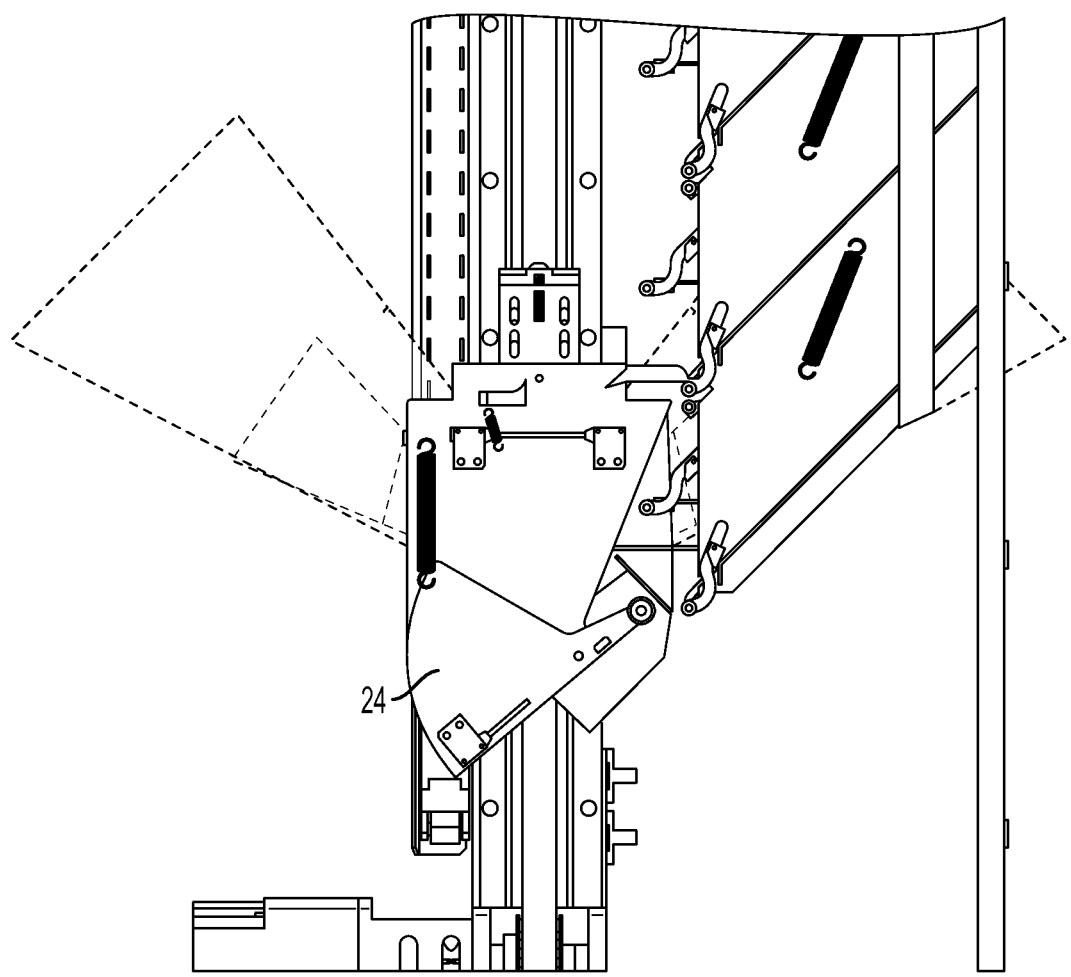
FIG. 9 illustrates a side elevation view of the product delivery basket with delivery door partially opened, according to embodiments of the present invention.
Figure 10:
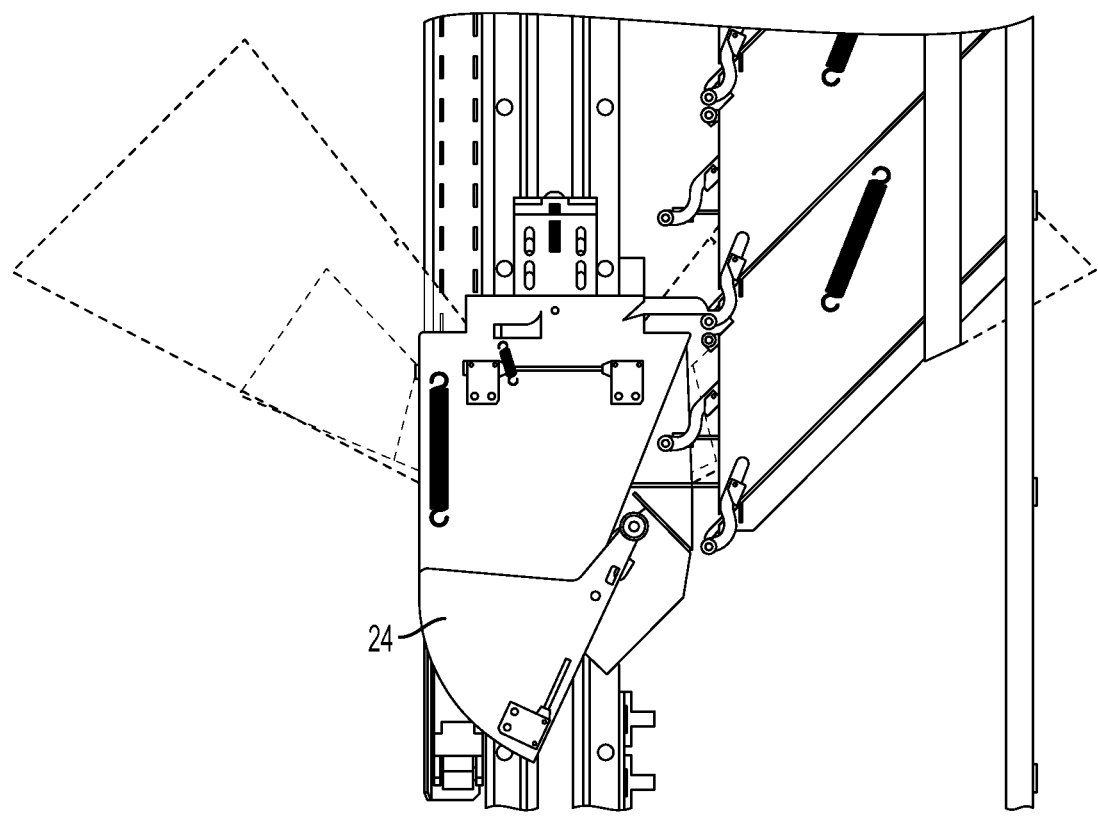
FIG. 10 illustrates a side elevation view of the product delivery basket with delivery door fully opened, according to embodiments of the present invention.
Figure 11:
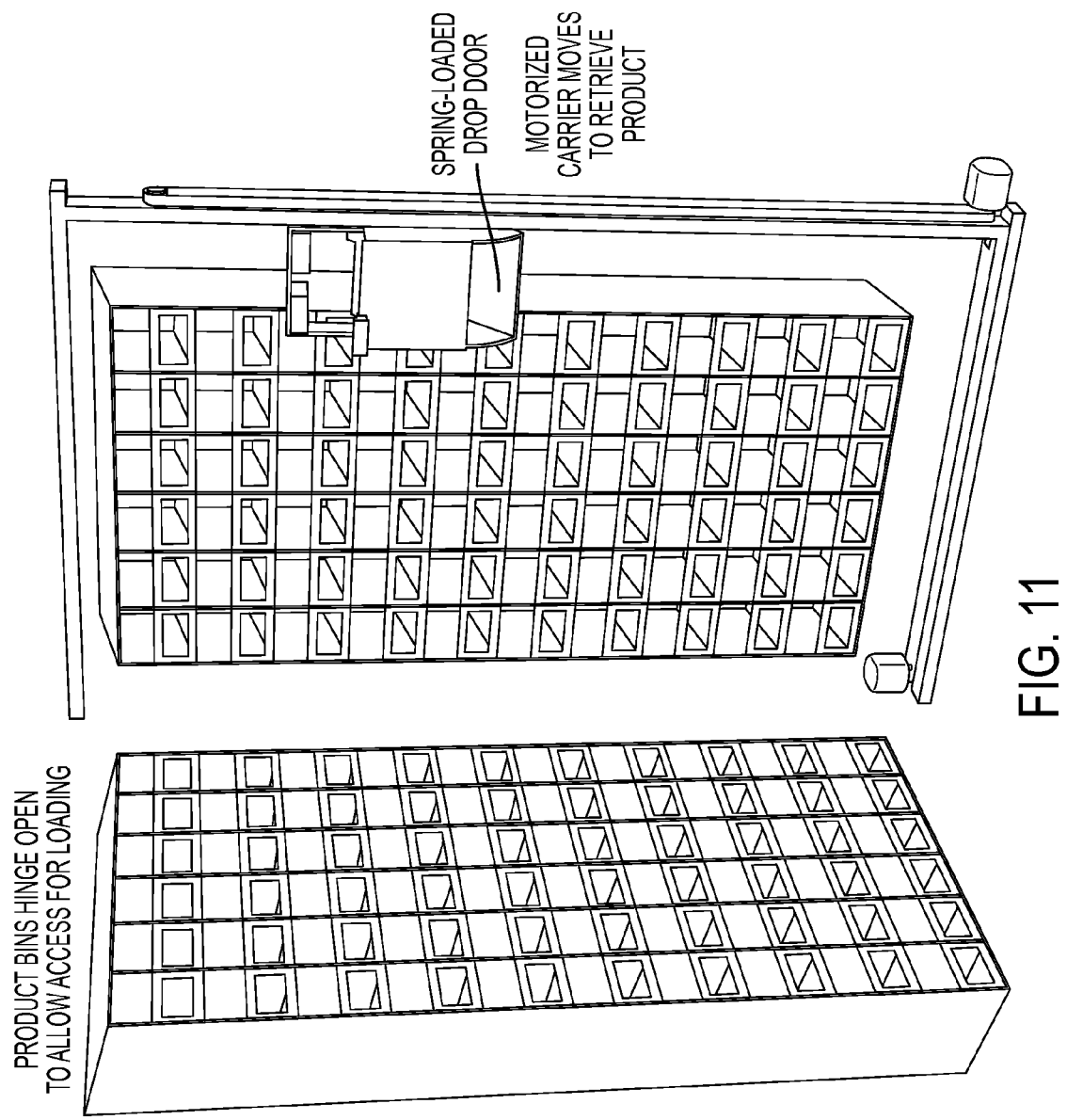
FIG. 11 illustrates a perspective view of an alternative automated retail system, according to embodiments of the present invention.
Figure 12:
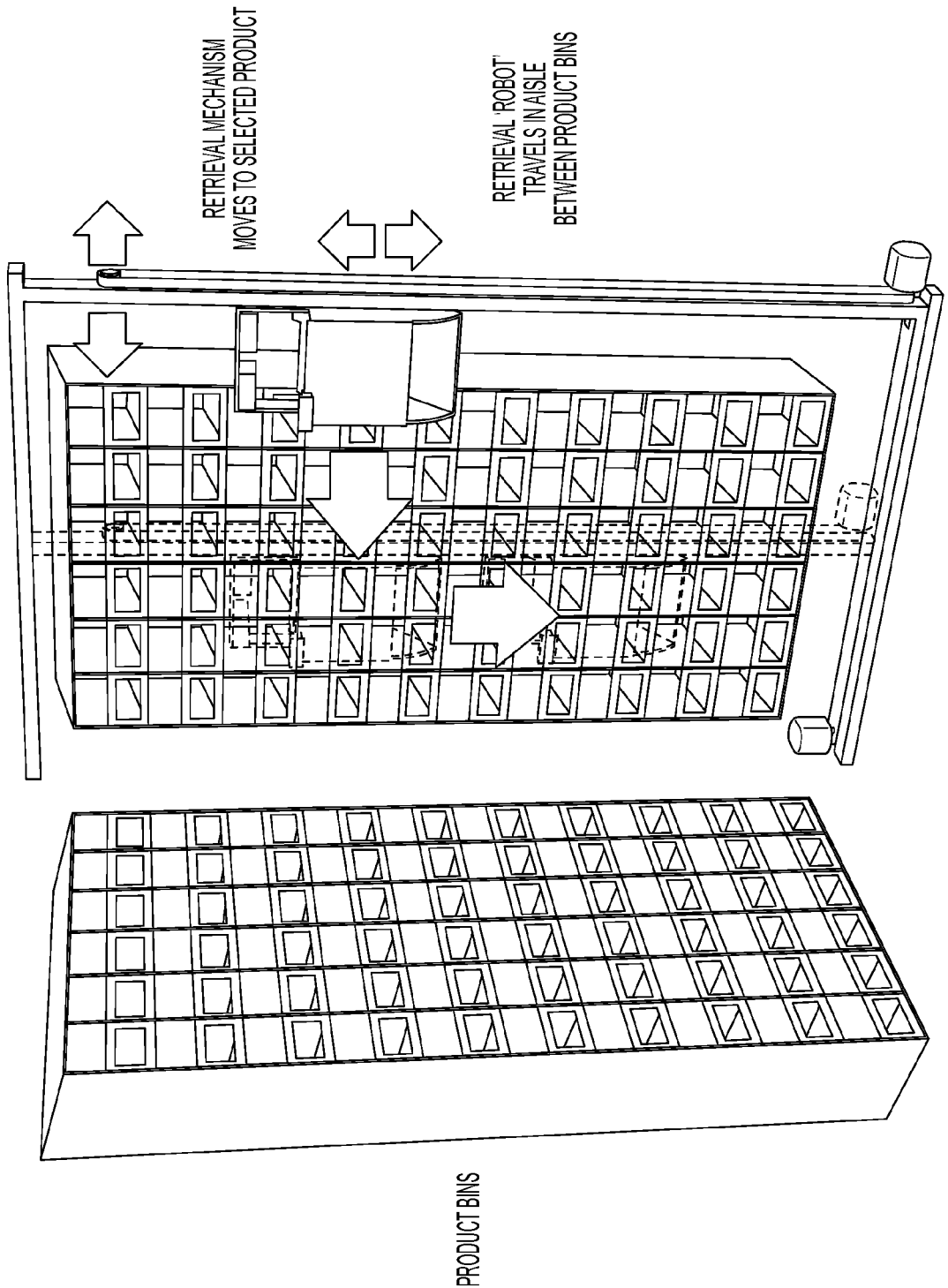
FIG. 12 illustrates a perspective view of the alternative automated retail system of FIG. 11, according to embodiments of the present invention.
Figure 13:
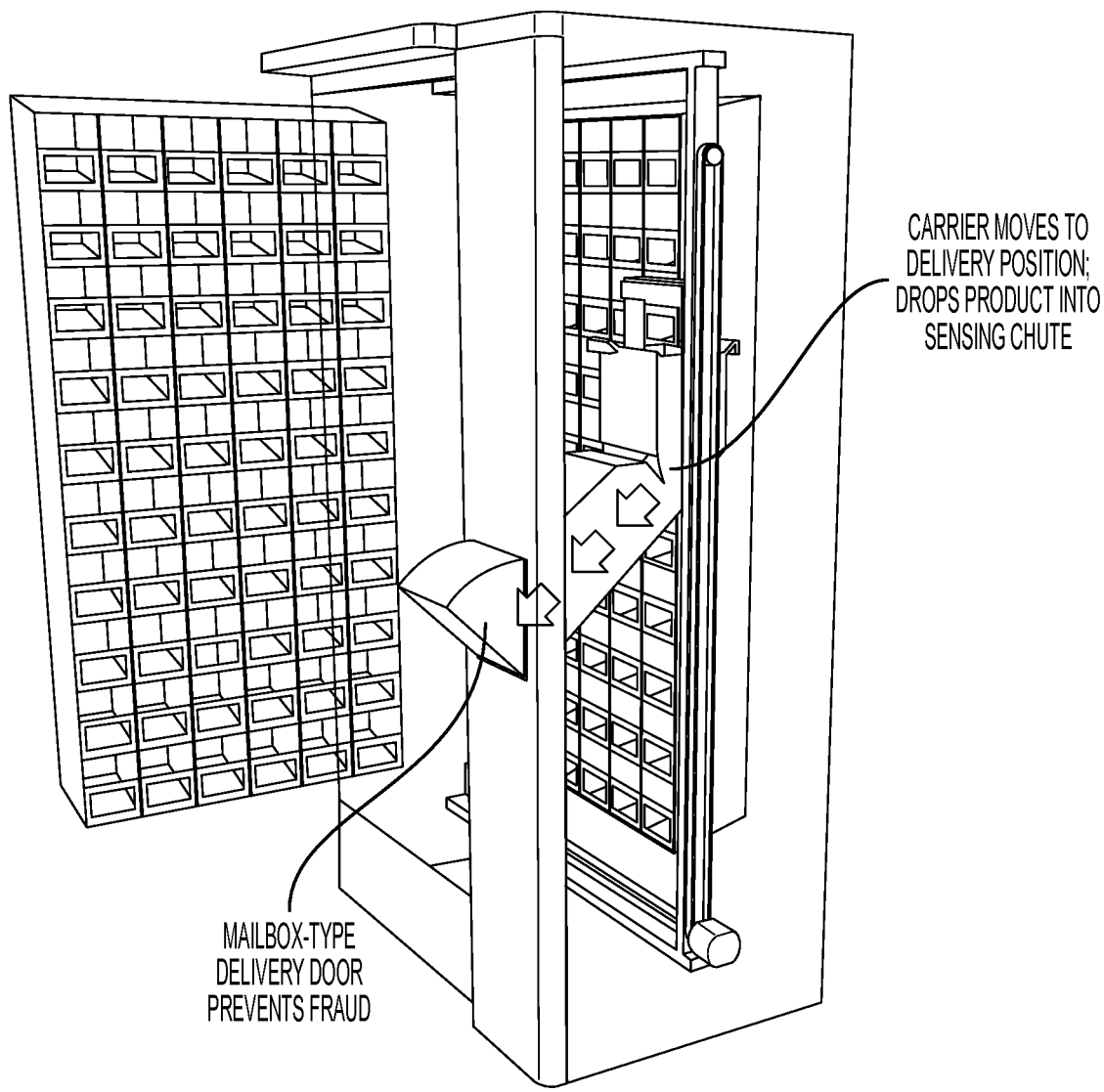
FIG. 13 illustrates a perspective view of the alternative automated retail system of FIGS. 11 and 12, according to embodiments of the present invention.
Figure 14:
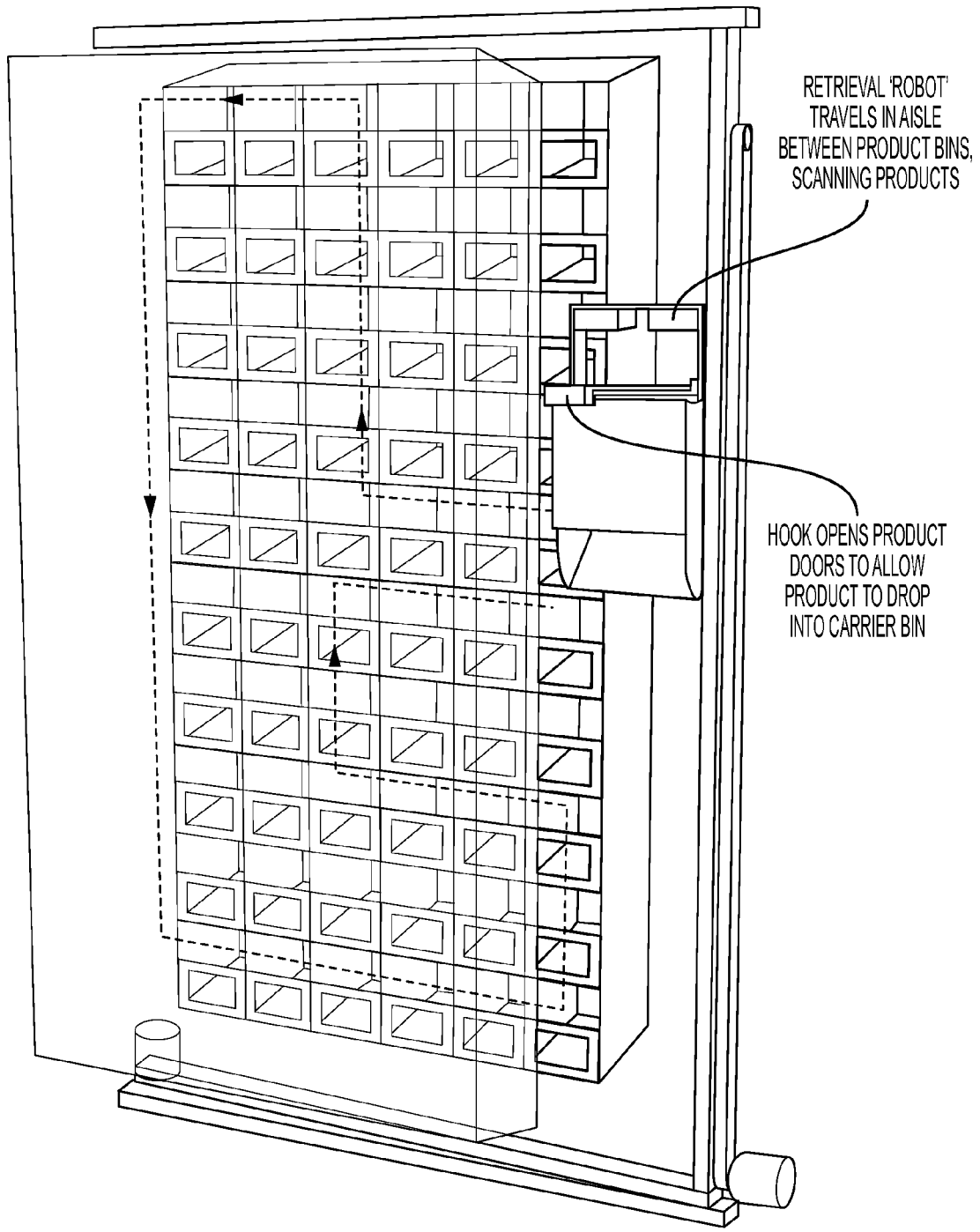
FIG. 14 illustrates a perspective view of the alternative automated retail system of FIGS. 11 to 13, according to embodiments of the present invention.

As shown in FIG. 8, once the desired product has been received into the basket 22, the basket 22 may be moved along the x-y plane until it is positioned directly above a trap door actuator 84. The trap door 24 of the basket 22 pivots about pivot point 44 (see FIG. 4), and includes a contact element 82, which may be similar to contact element 68 previously described. When the basket 22 is lowered from the position shown in FIG. 8, the contact element 82 contacts the trap door actuator 84, and the trap door 24 is opened. FIG. 9 illustrates the trap door 24 in a partially open position, and FIG. 10 illustrates the trap door 24 in a fully opened position. Once the trap door 24 is opened, the product slides or falls by gravity into the delivery chute 26, and may be retrieved by a user through a delivery door 28.

According to embodiments of the present invention, each door 62 includes a transparent window 64, which permits the scanner 36 or scanners, imagers, RFID transceivers, and/or cameras, at any desired time, to move along the x-y plane and take inventory of the automated retail system 10. This facilitates loading or stocking of the system 10 with new product, and also facilitates inventory tracking and control. When a user manually loads new products into the product rack 12, the basket 22 moves to positions corresponding to each product bin, and scanning system 36 determines the contents of each receptacle and/or location of each inventory item. This prevents the inventory personnel from having to place certain products in certain locations, and/or having to manually indicate to the system 10 the actual bin location of each product. Optionally, the scanning system 36 may be used to confirm the contents of a particular bin before the door to that bin is opened, and/or to confirm the absence of the contents of a particular bin at any time. The system 10 may also be programmed to automatically scan the inventory at certain time intervals, for example every eight hour period. The system 10 can also make a note of bins for which an inconclusive scan was performed, and create a flag for later follow-up by a technician, and to remove the problem bin from the immediately available retail inventory of the system 10.

The sensors/scanners 36 and/or 37 may also be used to sense or scan the delivery of a product from the bin into the basket 22, and/or from the basket 22 into the delivery chute 26. Other different sensors and types of sensors may also be used for these purposes. For example, each door 62 may include a door position sensor 70 (see FIG. 6) configured to convey a signal indicating a position of the door 62 to the control system. This may be a simple "open/closed" indication, and/or may include an incremental or relative position of the door, according to embodiments of the present invention. Other optical, camera, imager, laser, and/or RFID sensors may be included in, on, and/or near the basket 22 in order to sense or confirm product location and/or delivery. For example, sensor 63 on the basket 22 may be used to sense the passage of a product from within a bin in the rack 12 to within the basket 22, and sensor 61 on the trap door 24 may be used to sense the passage of a product from within the basket 22, down the trap door 24, and into the delivery chute 26, according to embodiments of the present invention.

Although a particular trap door 24 mechanism is described herein, other trap door-type mechanisms, as well as other non-trap door-type mechanisms, may be used to retain the product on or within the basket 22 between the time the basket 22 receives the product and the time the basket 22 conveys the product to the delivery chute 26, according to embodiments of the present invention. For example, the basket 22 may include a bottom which slides out horizontally from under the basket 22 to release a product therein.

Although FIGS. 5-10 illustrate the door opening and product retrieval from the rear product rack 12, the basket 22 and rail system may also be used to open doors and retrieve products from the front product rack 14 in a similar manner, according to embodiments of the present invention. The basket 22 may include another door actuator extending from the basket 22 in a direction toward the front product rack 14, similar to how the door actuator 32 extends toward the rear product rack 12. According to embodiments of the present invention, the vertical and/or horizontal placement of the bins of the front product rack 14 may be offset in an x and/or y direction with respect to the corresponding placement of the bins of the rear product rack 14, to facilitate movement of the basket 22. According to other embodiments of the present invention, the bins of the front product rack 14 are not offset with respect to the bins of the rear product rack 12, and the basket 22 and door actuators 32 are simply maneuvered around the contact elements 68 of each door to avoid accidental collisions as the basket 22 is moved along the x-y plane.

FIGS. 11-14 illustrate operation of an automated retail system similar to system 10, according to embodiments of the present invention.

Figure 15:
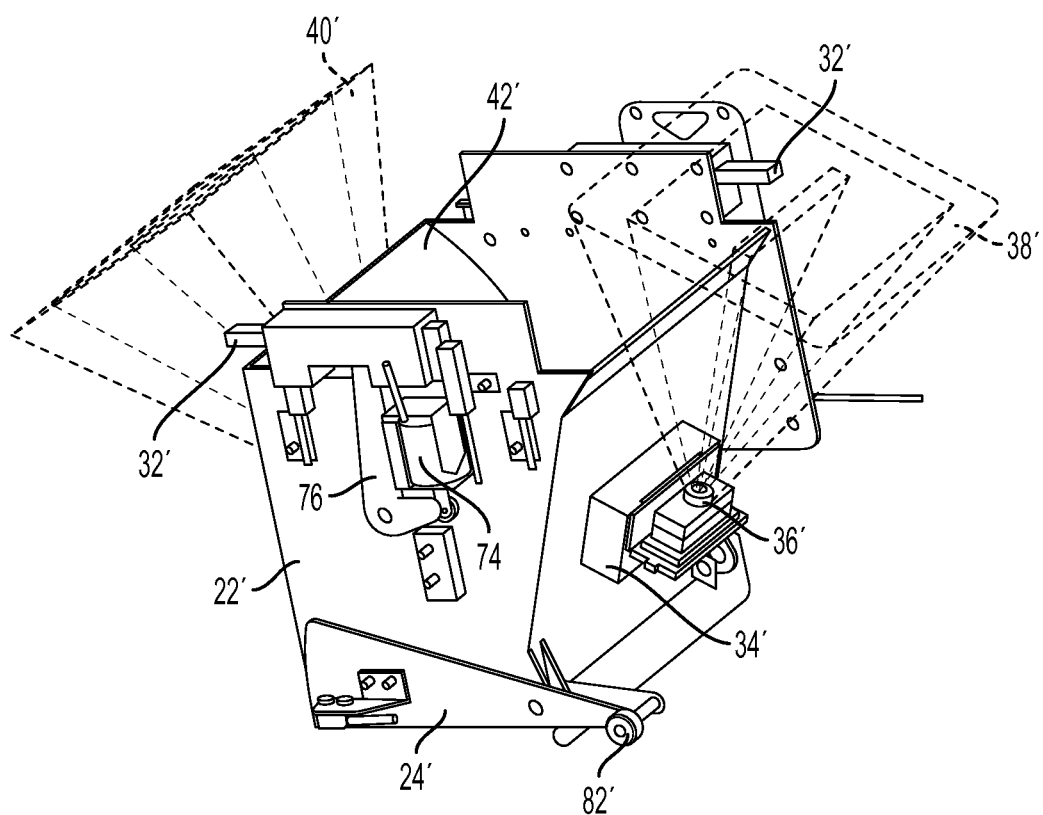
FIG. 15 illustrates a perspective view of a product delivery basket, according to embodiments of the present invention.

FIG. 15 illustrates a perspective view of a product delivery basket 22', according to embodiments of the present invention. Product delivery basket 22' may include some or all of the features or characteristics described with respect to product delivery basket 22, and product delivery basket 22 may include some or all of the features or characteristics described with respect to product delivery basket 22', according to embodiments of the present invention. Product delivery basket 22' includes a basket trap door 24', which extends under the bottom of the product delivery basket 22' in a closed configuration, and a door actuator 32', according to embodiments of the present invention. Instead of having a laterally adjacent sensor mount 34 like basket 22, the sensor mounts 34' of basket 22' are on the basket 22' itself, according to embodiments of the present invention. A product identification sensor 36' is located on the sensor mount 34', and a similar product identification sensor may be located on another sensor mount on the other side of the basket 22', according to embodiments of the present invention. Product identification sensors 36' may be laser-based bar code scanners, camera or imaging sensors, and/or radio frequency identification (RFID) sensors, according to embodiments of the present invention. The superimposed projection cones 38', 40' are included to illustrate an exemplary three-dimensional range of the sensors 36', according to embodiments of the present invention.

Basket 22' may operate similarly to basket 22, according to embodiments of the present invention. According to some embodiments of the present invention, the door actuators 32' are retractable and extendable, to further facilitate the navigation of the basket in the x-y coordinate system over the various compartments. For example, when the basket 22' is moved along the gantry system in the x-y directions, the door actuators 32' may be retracted so that they do not catch on or otherwise interfere with the hardware of the display rack (e.g. the door actuators or the compartments themselves). The door actuators 32' may be extended when a particular compartment is selected for opening, according to embodiments of the present invention. Although the basket 22' is shown with two opposing door actuators 32', the basket 22' may alternatively include only one door actuator 32', or more than two door actuators 32', depending on the arrangement of the front and/or back panels and the particular door opening mechanisms used. The door actuators 32' may be actuated with an electronically controlled solenoid 74 and pivot arm 76, or with various other electronically controlled or other mechanisms, according to embodiments of the present invention. Basket 22' also includes a trap door 24' and contact element 82' which operate similarly to trap door 24 and contact element 82, according to embodiments of the present invention.

Figure 16:
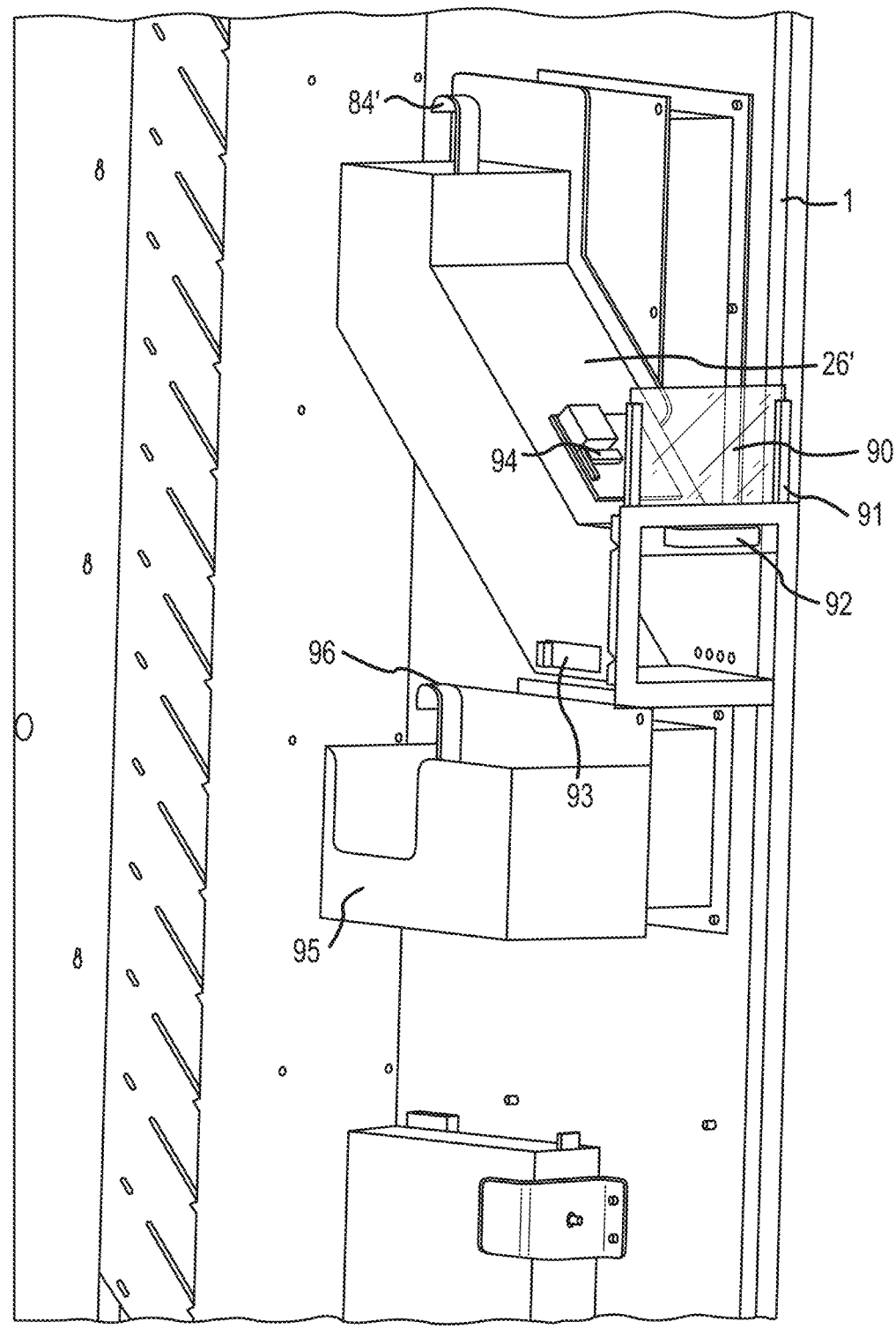
FIG. 16 illustrates a perspective view of an inside of an alternative automated retail system enclosure, showing a product delivery chute, according to embodiments of the present invention.

FIG. 16 illustrates a perspective view of an inside of an alternative automated retail system enclosure or housing 1, showing a product delivery chute 26', according to embodiments of the present invention. Product delivery chute 26' and trap door actuator 84' operate similarly to product delivery chute 26 and trap door actuator 84, according to embodiments of the present invention. The basket 22' may be moved to just above the trap door actuator 84' and lowered until contact element 82' catches on trap door actuator 84', thereby opening the trap door 24' and causing the dispensed product to fall from the basket 22' into the delivery chute 26', according to embodiments of the present invention. The delivery chute 26' may include one or more lighting and/or sensing apparatus 93, 94 configured to identify the receipt of a product at the bottom of the chute 26' and/or to scan the product at the bottom of the chute 26' to identify and/or confirm the identity of the product, according to embodiments of the present invention. For example, system 93 may create a light curtain across the delivery chamber which is interrupted when a product arrives. The delivery chute 26' may include a delivery door 90, for example a door 90 which slides up and down on tracks 91 and has a handle 92 for lifting the door, according to embodiments of the present invention. According to embodiments of the present invention, the opening of door 90 is locked until a product is ready to be retrieved from the chute 26'.

FIG. 16 also shows an auxiliary bin 95. Auxiliary bin 95 may also have a trap door actuator 84'. Products may be delivered by the basket 22' to the auxiliary bin 95 in much the same way that they are delivered to the delivery chute 26', by positioning the basket 22' over the door actuator 96 and lowering the basket 22' until contact element 82' catches on the door actuator 96, thereby opening the trap door 24' and causing any product within the basket 22' to fall into the auxiliary bin 95. The auxiliary bin 95 may be used to receive items which have expired, items which require additional attention before being dispensed, and/or items to be disposed of, for example. The auxiliary bin 95 may also be used by basket 22' to open the trap door 24' in situations in which the control system for the basket 22' cannot determine the identity of a particular product and/or cannot determine whether a product is in the basket 22'. The auxiliary bin 95 may also be used to release products in cases in which the basket 22' detects or suspects the presence of more than one or of too many products within the basket 22', to prevent the dispensation of too many products or unknown products, according to embodiments of the present invention.

Figure 17:
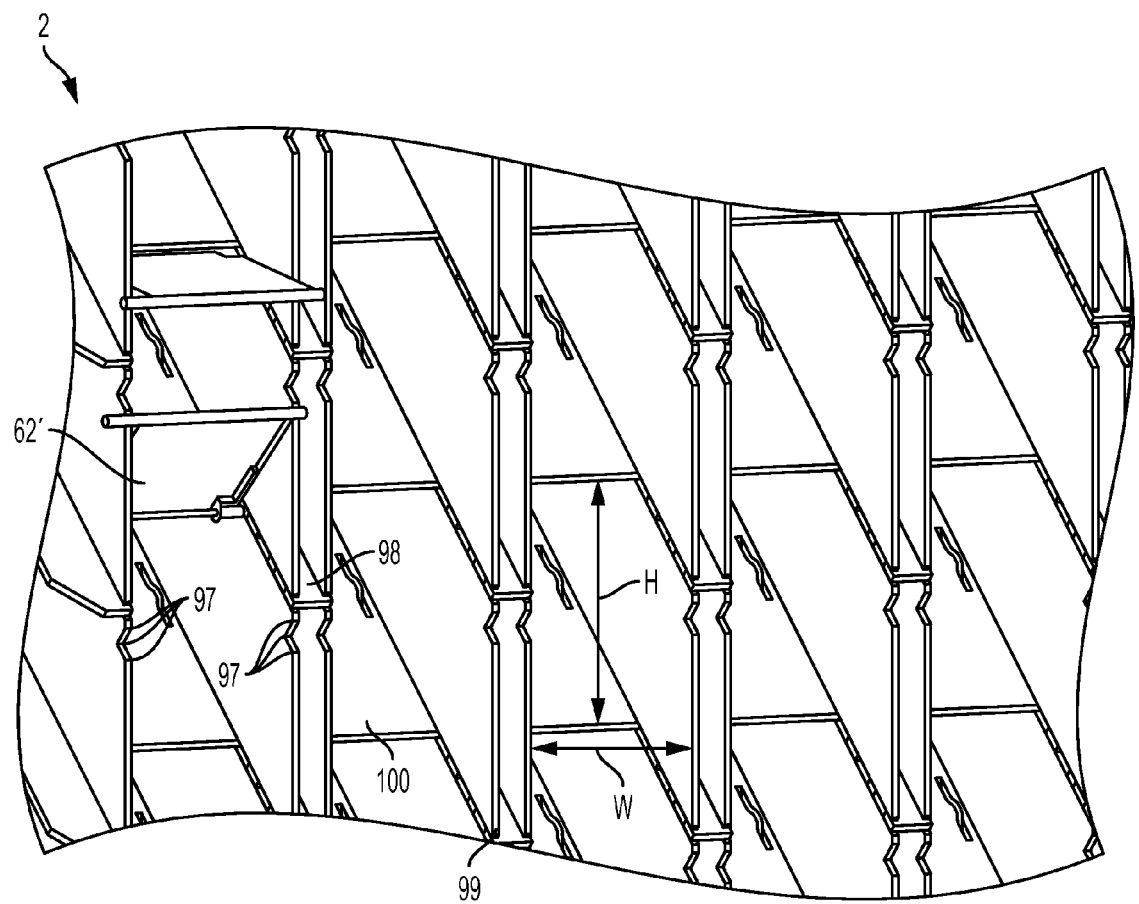
FIG. 17 illustrates a front perspective view of a product rack for an automated retail system, according to embodiments of the present invention.

FIG. 17 illustrates a front perspective view of a product rack 2 for an automated retail system, according to embodiments of the present invention. The rack 2 includes compartments as described above, with each compartment having a width W and a height H, according to embodiments of the present invention. The rack 2 may be formed of various plates, which may be metal or plastic or other rigid or semi-rigid material. For example, the bottom of each chamber may be formed of a bottom plate 100, and the sides of each chamber may be formed of vertical plates 99. A spacer plate 98 may be located between adjacent vertical panels 99, and may in some cases operate as a stop for the door 62' when the door 62' is fully opened, according to embodiments of the present invention. These sheets or plates 98, 99, 100 may be used to create compartments which are customizable in size and easy to assemble. As described above, the plates 100 may interface with the vertical plates 99 so as to create a downward slope to permit products sitting on top of the plate 100 in each compartment to slide down over the door 62' when the door 62' is opened, according to embodiments of the present invention.

The control system which controls the position of the basket 22 or 22' uses sensors 36, 37, 36' which may also be configured to identify position or relative position. Using these sensors, the control system can identify the location of a compartment and determine the location of the basket 22 or 22' relative to the compartment. The sensor system may be configured to identify edges, for example the left-most and/or right-most edges of the vertical plates 99, which permit the control system to position the basket 22, 22' correctly in the x dimension. The sensor system may also be configured to identify one or more edges 97 formed as notches or breaks in the vertical plates 99, in order to permit the control system to position the basket 22, 22' correctly in the y dimension. As such, the same basket 22, 22' and sensor systems may be used with a wide variety of different compartment sizes and configurations. The basket 22, 22' and sensor systems may also be used to scan and deliver items from a rack which includes differently-sized compartments on the same rack, using this position identification technology. This also permits the same programming to be used for different rack configurations, thereby decreasing the cost of such systems and making them easier to physically update and/or configure.

According to some embodiments, the sensor system can scan the contents of a compartment while at the same time identifying one or more indicators of the location or boundary of the compartment. According to some embodiments, multiple baskets 22, 22' may be used simultaneously or independently for the same or different products racks within the overall system.

The automated retail system may include an initialization sequence or protocol for the control system of the basket 22 or 22', according to embodiments of the present invention. The basket 22 may begin in a "home" or starting position, for example in the upper or lower left-hand or right-hand corner of a particular product rack 2, and may then use the position sensor as the basket 22 moves to the right or left to count the number of vertical plates 99 until it reaches a stop (either virtual or actual), and may also move up or down to count the number of vertical edge indicators 97 until it reaches a stop (either virtual or actual), to create an internal "map" of the location of each compartment. This initialization sequence may be performed upon machine startup, or at regularly scheduled intervals, or when the system detects a fault state or otherwise encounters an error. The scanning of each product in each compartment may be done simultaneously with or at a different time from this initialization sequence. Also, the initialization sequence may be performed for one of the front and back racks and then the other, or alternatively with sensors on both sides of basket 22, may be performed simultaneously for the front and back racks during the same pass of the basket 22. An initialization sequence for basket 22' may be controlled in a similar fashion.

According to some embodiments of the present invention, it may be desirable to affirmatively indicate to the scanners or sensors 36, 37, 36' when there is no item present in a particular compartment. The doors 62' of the compartments may be transparent to permit the bar code or other identifier on an item to be scanned through the door. When the basket 22 does not detect any item within the compartment, it may be configured to "jiggle" back and forth and/or up and down for a short period of time in order to increase the chances of scanning an item in the compartment. If no item is detected, then the controller may determine that no item is present in the compartment. According to some embodiments of the present invention, the controller then causes the basket 22 or 22' to open that particular compartment, and to deliver any contents to the auxiliary bin 95. According to some embodiments of the present invention, a special bar code or other indicator is placed on the top of the plate 100, such that when an item is present in the compartment the item covers such special bar code or other indicator, such that the scanner scans only the item in the compartment, and such that when an item is not present in the compartment, the scanner scans the special bar code or other indicator which indicates that the compartment is empty. Such a special bar code or other indicator may alternatively be placed on the outside or inside of the door 62, 62', and operate in a similar fashion.

Figure 18:
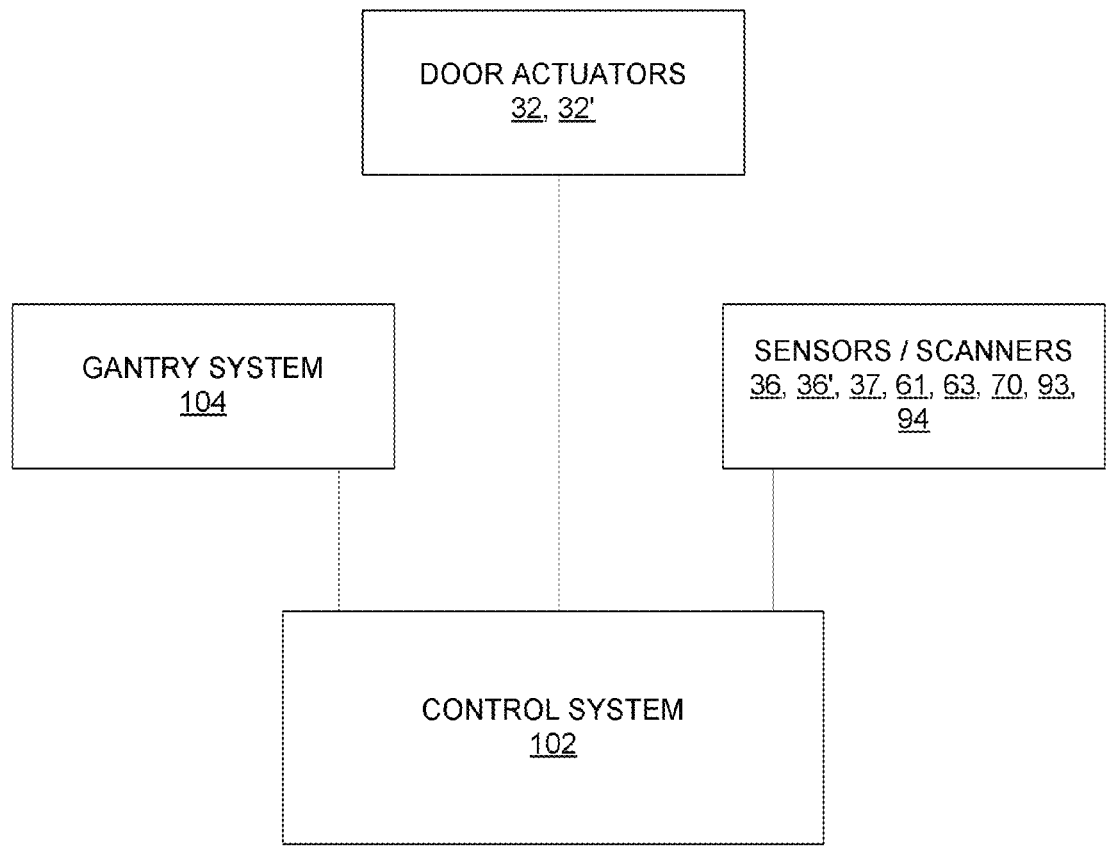
FIG. 18 illustrates an automated retail system, according to embodiments of the present invention.

FIG. 18 illustrates an automated retail system, according to embodiments of the present invention. A control system 102 is communicably coupled to the gantry system 104, actuators or other machinery (e.g. actuators 32, 32'), and sensors and/or scanners or other sensing devices (e.g. 36, 36', 37, 61, 63, 70, 93, and 94). The gantry system 104 may include rail system 16, 18, 20 and associated cables, motors, electronics, and other hardware for moving the delivery basket 22 along the horizontal axis x and the vertical axis y, according to embodiments of the present invention. Control system 102 may be a personal computer or other computing device, according to embodiments of the present invention.

The control system 102 is capable of executing instructions to perform the steps and methods described herein, in whatever order, and excluding one or more steps and/or including one or more additional steps or repetitions of steps, according to embodiments of the present invention. The control system 102 receives information or signals and, based on such information or signals, sends out control signals to cause the gantry system 104, actuators 32, 32', and other hardware to move accordingly, as described herein. The control system may also receive information from other hardware, not shown, for example a user interface touchscreen which receives selections from users of products to retrieve from compartments. The control system 102 may also rely on other sensors or signals not expressly shown, but which are apparent to one of ordinary skill in the art based on the present disclosure. For example, positional sensors may be used to provide the control system 102 with the two-dimensional (or three-dimensional) position of any piece of hardware described herein.

When a customer or requester indicates to the control system 102 that a particular product or item is desired, the control system 102 checks its database or listing of inventory based on its last scanning routine and/or initialization sequence. The control system 102 may find multiple matches for the product or the type of product requested. The control system 102 then controls the delivery basket 22 to send it, via the gantry system 104, to a particular compartment holding the particular product that has been requested. According to embodiments of the present invention, the scanner 36, 37 then scans the contents of the compartment again to verify again that the particular product is actually in the compartment. Systems which rely on manual and/or pre-positioned and/or pre-programmed inventory information do not have this capability, to confirm the presence and identity of the product just prior to dispensing. Once the product is verified, the door 62 to the compartment is opened, and the product is received in the delivery basket 22, at which point it may then be scanned again, or a different kind of sensor may be used to sense that the product has entered the basket 22, according to embodiments of the present invention. As such, embodiments of the present invention include an ability to determine the size, and layout of a customized grid of compartments, on one or both of a front compartment rack and a rear compartment rack, and scan and record/update the contents of each compartment. This may be done not only upon initialization or startup, but also after restocking, and also at any point in time. Also, individual compartments can be selectively scanned to confirm their contents, for example just prior to vending the product or otherwise opening the compartment's door. This automated inventory control reduces system errors, and also automates the process of taking inventory of the particular rack or racks or set of compartments.

Figure 19:
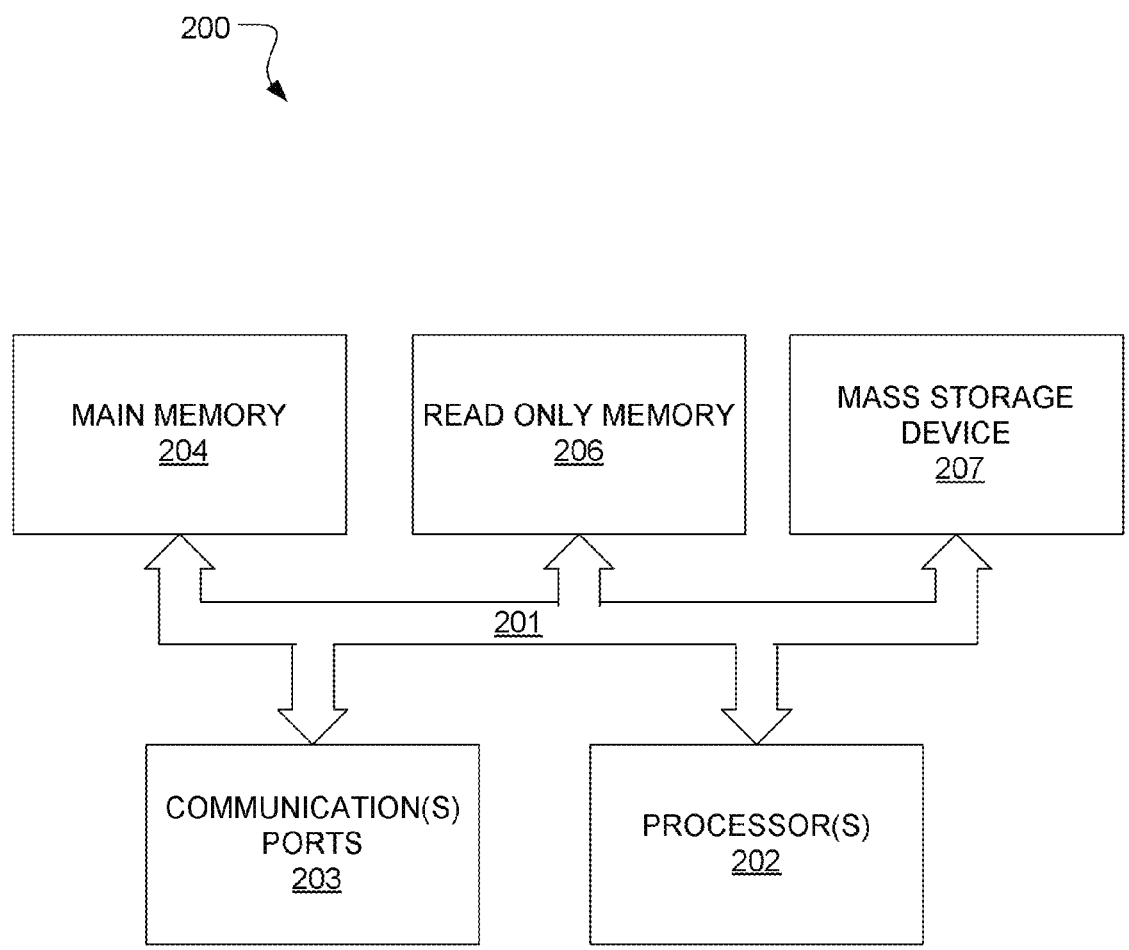
FIG. 19 illustrates a computer system, according to embodiments of the present invention.

FIG. 19 is an example of a computer system 200 with which embodiments of the present invention may be utilized. Computer system 200 represents an exemplary computer, which may operate as controller 102 in order to receive inputs (e.g. from sensors) and/or provide outputs (e.g. to control the gantry system and/or door actuator, among others). In this simplified example, the computer system 200 comprises a bus 201 or other communication means for communicating data and control information, and one or more processing devices 202, such as a well known processor, Application Specific Integrated Circuit (ASIC), a field programmable gate array (FPGA), or the like, coupled with bus 201.

In this simplified embodiment, computer system 200 further comprises a random access memory (RAM) or other dynamic storage device (referred to as main memory 204), coupled to bus 201 for storing information and instructions to be executed by processing device 202. Main memory 204 also may be used for storing temporary variables or other intermediate information during execution of instructions by processor(s) 202.

Computer system 200 can also include a read only memory (ROM) 206 and/or other static storage device coupled to bus 201 for storing static information and instructions for processing device 202. A mass storage device 207, such as a magnetic disk or optical disc and its corresponding drive, may also be coupled to bus 201 for storing instructions and information, such as configuration files, a key store and registration database, and the like.

One or more communication ports 203 may also be coupled to bus 201 for supporting network connections and communication of information to/from the computer system 200 by way of a communication network, such as a Local Area Network (LAN), Wide Area Network (WAN), or the Internet, for example. The communication ports 203 may include various combinations of well-known interfaces, such as one or more modems to provide network access, one or more 10/100 Ethernet ports, one or more Gigabit Ethernet ports (fiber and/or copper), or other well-known network interfaces commonly used in internetwork environments. In any event, in this manner, the computer system 200 may be coupled to a number of other network devices, communication devices, clients, NTMs, and/or servers via a conventional communication network infrastructure.

Optionally, operator and administrative interfaces (not shown), such as a display, keyboard, and a cursor control device, may also be coupled to bus 201 to support direct operator interaction with computer system 200. Other operator and administrative interfaces can be provided through network connections connected through communication ports 203. Finally, removable storage media (not shown), such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 201 via corresponding drives, ports or slots.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A system for automated retail comprising:
a product rack, the product rack comprising a plurality of compartments arranged along one or both of a horizontal axis and a vertical axis, the plurality of compartments being configured to carry items to be delivered by the system, wherein each of the plurality of compartments comprises a door configured to open and close the compartment, wherein at least a portion of the door is substantially transparent;
a product delivery device;
a gantry system, wherein the product delivery device is movably coupled to the gantry system, wherein the gantry system is configured to position the product delivery device adjacent to any of the plurality of compartments by moving the product delivery device along one or both of the horizontal axis and the vertical axis;
a scanner that moves with the product delivery device, wherein the gantry system is configured to move the product delivery device and the scanner to positions corresponding to each of the plurality of compartments, wherein a scanner signal of the scanner is configured to pass through the at least a portion of the door of each of the plurality of compartments; and
a controller comprising a non-transitory computer-readable medium containing instructions that, when executed, cause one or more processors to perform the following:
determining an inventory of the system by at least one of (1) for each of the plurality of compartments, using the scanner to transmit the scanner signal through the at least a portion of the door to identify an item carried by the compartment or determine that the compartment is empty; and (2) using the scanner to transmit the scanner signal through the at least a portion of the door to determine a location of each item carried by the plurality of compartments;
receiving a request for delivery of an item carried by the product rack;
in response to receiving the request, using the scanner to confirm the identity of the item by transmitting the scanner signal through the at least a portion of the door of a compartment of the plurality of compartments carrying the item; and
in response to confirming the identity of the item, instructing the product delivery device to deliver the item.

2. The system of claim 1, wherein the plurality of compartments comprises three or more compartments.

3. The system of claim 1, further comprising a door actuator carried by the product delivery device, wherein the door actuator is configured to open the door upon movement of the product delivery device along one or both of the horizontal axis and the vertical axis.

4. The system of claim 3, wherein the door comprises a contact element, and wherein the door actuator is configured to open the door when the door actuator is pushed against the contact element.

5. The system of claim 1, wherein determining the inventory of the system comprises determining the inventory of the system at certain time intervals.

\* \* \* \* \*